United States Patent [19]
Isaka

[11] Patent Number: 5,946,001
[45] Date of Patent: Aug. 31, 1999

[54] OUTPUT APPARATUS WITH CHANGEABLE FONT RESOLUTION

[75] Inventor: Yukio Isaka, Yokohama, Japan

[73] Assignee: Canon Kabushiki Kaisha, Tokyo, Japan

[21] Appl. No.: 08/483,158

[22] Filed: Jun. 7, 1995

Related U.S. Application Data

[63] Continuation of application No. 08/240,819, May 11, 1994, abandoned, which is a continuation of application No. 07/587,105, Sep. 24, 1990, abandoned.

[30] Foreign Application Priority Data

Sep. 26, 1989 [JP] Japan ................................. 1-251217

[51] Int. Cl.⁶ ................................................ G06T 11/00
[52] U.S. Cl. ...................... 345/470; 345/467; 345/192; 345/194; 395/110
[58] Field of Search .................................... 395/102, 110, 395/128, 139, 150, 151; 358/300; 345/192, 194, 141, 467, 470, 471, 472, 195

[56] References Cited

U.S. PATENT DOCUMENTS

| | | | |
|---|---|---|---|
| 4,660,998 | 4/1987 | Tsuneki ..................................... 400/61 |
| 4,715,006 | 12/1987 | Nagata .................................... 364/523 |
| 4,734,707 | 3/1988 | Sasaki ...................................... 346/33 |
| 4,807,156 | 2/1989 | Parisi ..................................... 395/102 |
| 4,837,712 | 6/1989 | Shibamiya .............................. 364/523 |
| 4,881,180 | 11/1989 | Nishiyama ............................. 364/518 |
| 4,897,638 | 1/1990 | Kokunishi et al. ..................... 340/751 |
| 4,901,249 | 2/1990 | Shiota .................................... 264/519 |
| 4,907,282 | 3/1990 | Daly et al. ............................. 395/150 |
| 4,953,033 | 8/1990 | Sakamoto ............................... 358/300 |
| 5,027,304 | 6/1991 | Jeng et al. .......................... 395/128 X |
| 5,045,869 | 9/1991 | Isaka et al. ............................ 346/108 |
| 5,226,116 | 7/1993 | Sasaki .................................... 345/467 |
| 5,297,246 | 3/1994 | Horiuchi et al. ........................ 395/150 |
| 5,365,599 | 11/1994 | Seto et al. .............................. 382/242 |
| 5,495,560 | 2/1996 | Kumada .............................. 345/467 X |

FOREIGN PATENT DOCUMENTS

| | | |
|---|---|---|
| 215664 | 3/1987 | European Pat. Off. . |
| 2588212 | 10/1986 | France .......................... G06K 15/02 |
| 3634185 | 3/1986 | Germany ...................... G06K 15/10 |
| 3634024 | 4/1987 | Germany . |
| 3723276 | 7/1987 | Germany ...................... G06K 15/02 |
| 3727804 | 8/1987 | Germany . |
| 3806223 | 2/1988 | Germany . |
| 3805573 | 9/1988 | Germany . |
| 3912595 | 4/1989 | Germany ...................... G06K 15/02 |
| 2172420 | 9/1986 | United Kingdom ............ H03M 7/00 |
| 2182471 | 5/1987 | United Kingdom ........... G06K 15/10 |
| 2197102 | 5/1988 | United Kingdom . |

OTHER PUBLICATIONS

IBM Technical Disclosure Bulletin, vol. 28, No. 11, Apr., 1986, New York US p. 503; "Vector Character Fonts in an All–Points–Addressable Printer".

Patent Abstracts of Japan, vol. 13, No. 480 (kokai 1–189692) (1989).

*Primary Examiner*—Mark K. Zimmerman
*Attorney, Agent, or Firm*—Fitzpatrick, Cella, Harper & Scinto

[57] ABSTRACT

Output apparatus that converts vector font data into dot font data in accordance with a change in output resolution has a first memory to store dot font data and a second memory to store vector font data. A change instruction circuit can instruct a change of output resolution. Whether dot font data of an output resolution corresponding to the change exists in the first memory is discriminated and a converter converts the vector font data in the second memory into the dot font data according to the changed output resolution on the basis of the instruction from the change instruction circuit and the result of the discrimination.

36 Claims, 6 Drawing Sheets

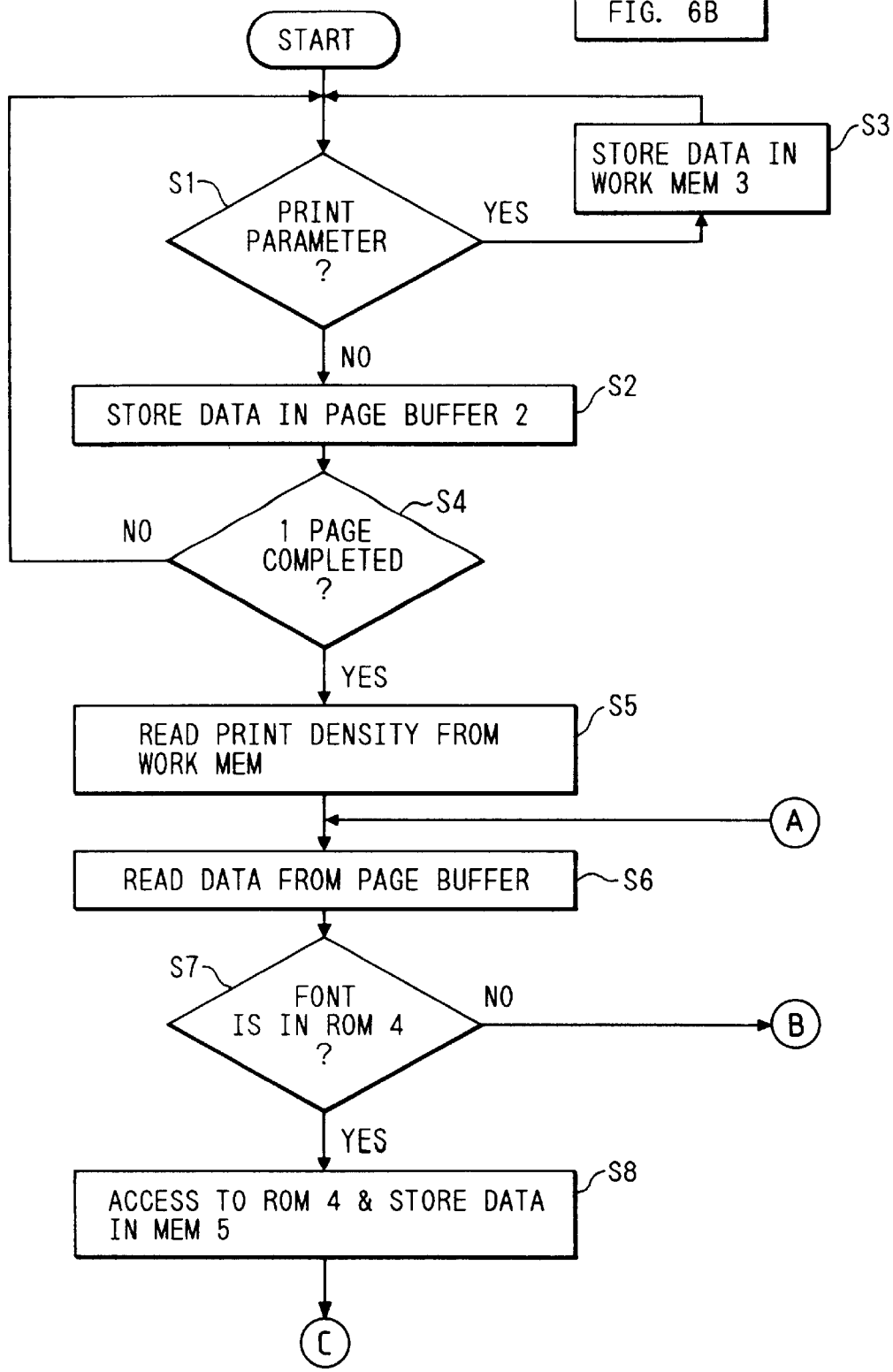

OUTPUT APPARATUS WITH CHANGEABLE FONT RESOLUTION

This application is a continuation of application Ser. No. 08/240,819, filed May 11, 1994, now abandoned, which was a continuation of application Ser. No. 07/587,105, filed Sep. 24, 1990, now abandoned.

BACKGROUND OF THE INVENTION

1. Field of the Invention

The present invention relates to an output apparatus which can convert vector font data into dot data in accordance with an output resolution which is changed.

2. Related Background Art

An output apparatus which can change an output resolution can be considered. However, for instance, assuming that the output resolution was changed from 240 dpi to 300 dpi, the number of constructing dots changes even in the case of a character of the same 10-point size. Thus, there is a problem such that two kinds of dot fonts are eventually necessary.

Therefore, there is a drawback such that it is necessary to provide dot font memories for a plurality of kinds of characters, figures, and the like and the costs rise.

As a method of solving the above drawbacks, use of a scalable font such as an outline font or the like has been considered. However, it takes a time to store the scalable font and the like. Consequently, this method has both a merit and a drawback.

SUMMARY OF THE INVENTION

In consideration of the above points, it is an object of the invention to provide an output apparatus comprising: first holding means for holding dot font data; second holding means for holding vector font data; change instructing means for instructing a change of an output resolution; discriminating means for discriminating whether dot font data to be output to the first holding means exists or not; and converting means for converting the vector font data held in the second holding means into the dot data in accordance with the output resolution on the basis of an instruction from the change instructing means and the result of the discrimination from the discriminating means.

BRIEF DESCRIPTION OF THE DRAWINGS

FIGS. 6A and 6B show a flowchart showing an example of a printing processing procedure according to the invention.

DETAILED DESCRIPTION OF THE PREFERRED EMBODIMENTS

Figure 1:
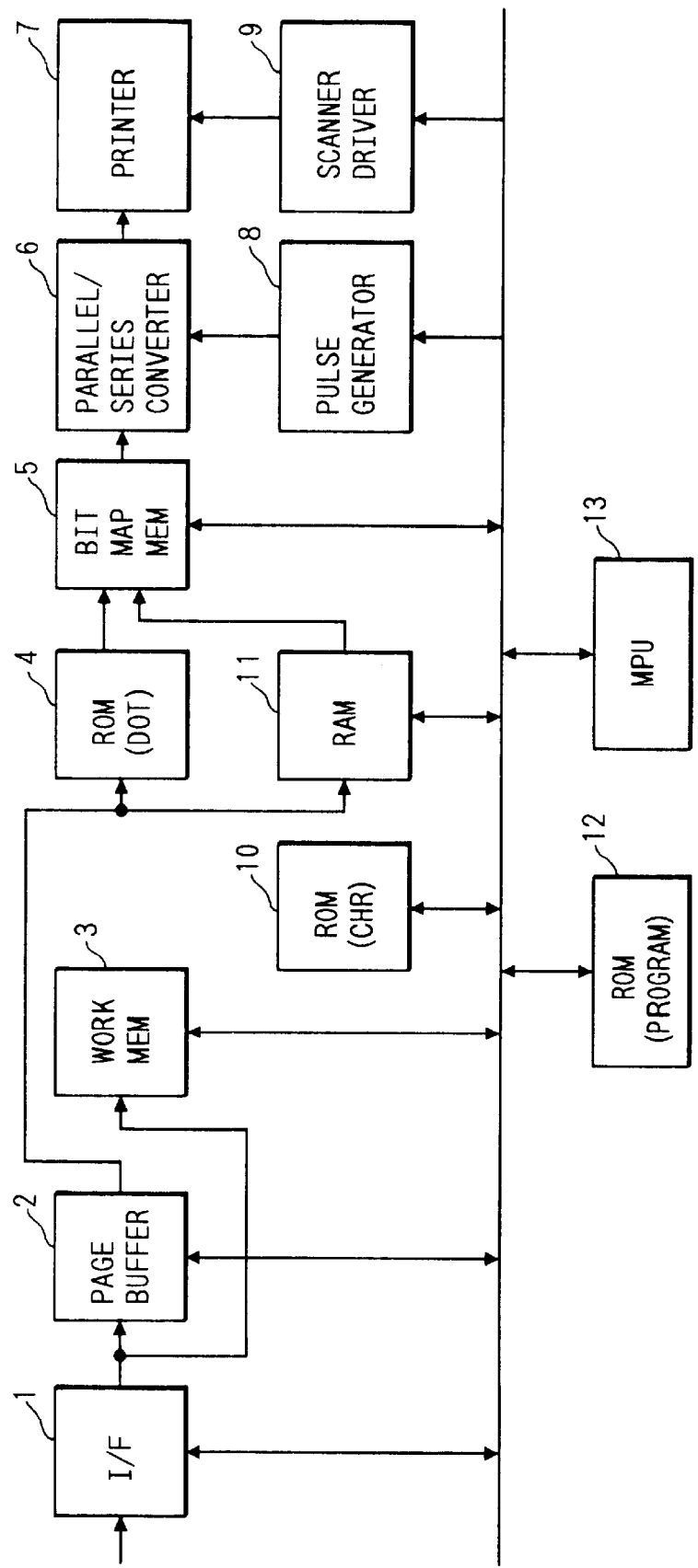
FIG. 1 is a block diagram of an embodiment of the present invention.

An embodiment of the present invention will be described hereinbelow with reference to the drawings. FIG. 1 is a constructional block diagram of a laser beam printer as an embodiment of the invention. Reference numeral 1 denotes an interface to receive data from the outside such as a host computer or the like; 2 a page buffer to store reception data of an amount of one page which is output; 3 a work memory; 4 a ROM in which dot patterns have been stored; 5 a bit map memory to store bit map patterns; 6 a parallel/series converter; 7 a printer; 8 a pulse generator; 9 a scanner driver; 10 a character pattern ROM; 11 a RAM; 12 a program ROM in which a program expressed by a flowchart of FIG. 6, which will be explained hereinafter, has been stored; and 13 an MPU.

Figure 2:
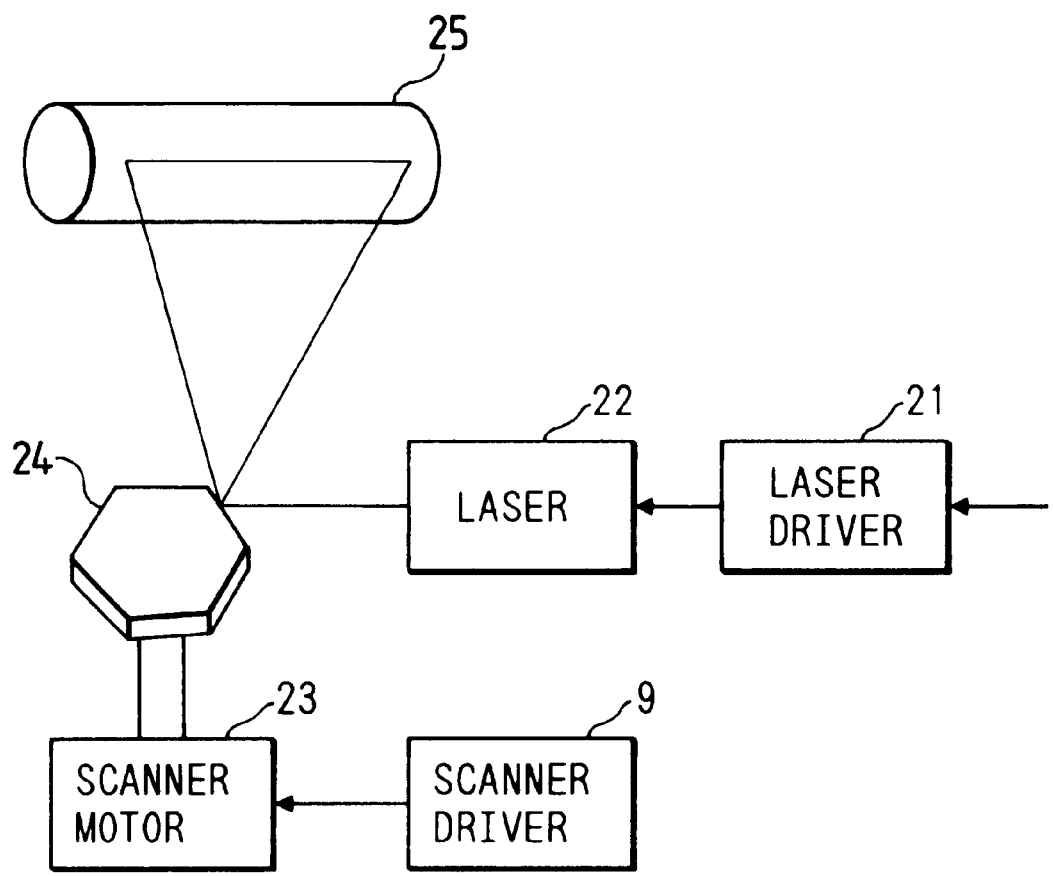
FIG. 2 is a diagram showing an embodiment of a printer in FIG. 1.

Data which is input from a host computer (not shown) through the interface 1 is command analyzed by the MPU 13 and is reconstructed as page data and is stored into the page buffer 2. On the other hand, print control parameters such as paper size, font size, print density (output resolution), and the like are stored into the work memory 3. After the data of one page has completely been prepared, the MPU 13 reads the print control parameters from the work memory 3 and determines the paper size, font size, and print density. Then, data is sequentially read out of the page buffer 2, the dot pattern memory 4 is accessed, and the dot patterns are stored into the bit map memory 5. The fonts which were developed into the dot patterns of a plurality of sizes have been stored in the dot pattern memory 4. After the data of one page was completely stored, the data is read out of the bit map memory 5 and is input to the parallel/series converter 6 and is converted into the serial signal. The serial signal is sent to the printer 7. The serial signal is called a video signal. FIG. 2 shows an example of the printer 7.

Reference numeral 21 denotes a laser driver to turn on/off a laser 22 by the video signal which is output from the parallel/series converter 6; 23 a scanner motor to drive a polygon mirror 24 at a rotational speed which is set by the scanner driver 9; and 25 a photo sensitive drum which is rotated at a predetermined speed by a drive motor (not shown). A laser beam deflected by the polygon mirror 24 forms an image onto the drum 25. An image is formed hereinafter by a well-known electrophotographic method.

Figure 3:
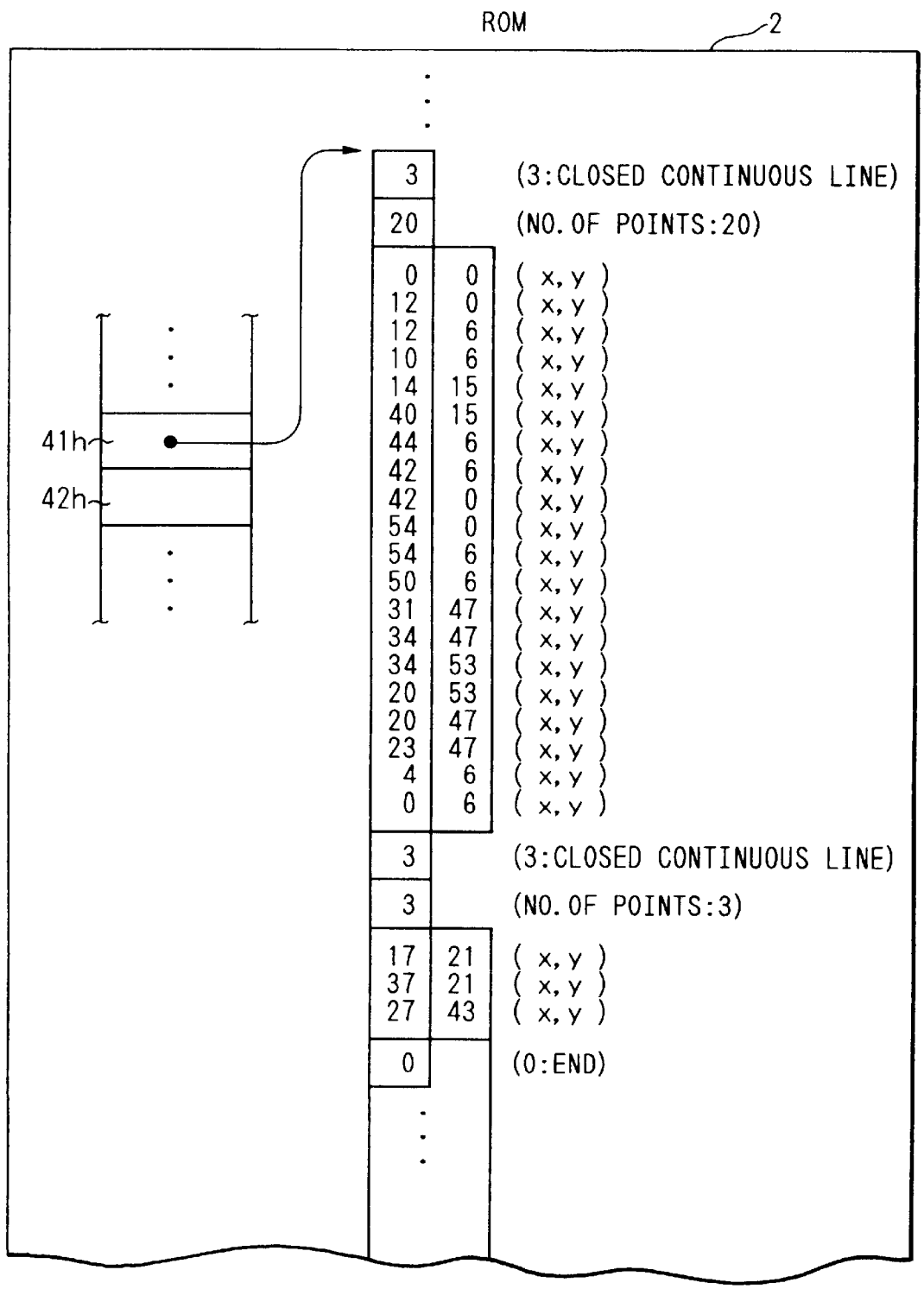
FIG. 3 is a diagram showing an example of the content of a character pattern ROM in FIG. 1.

The character pattern ROM 10 and RAM 11 in FIG. 1 will now be described. FIG. 3 shows the content of the character pattern ROM 10. Generally, what is called an outline font (vector font) is used here. That is, FIG. 3 shows an example in the case where a pattern of a character, a figure, or the like was held in a form other than the form of a dot image which can be printed without executing any process and relates to an example in which the outline portion of the character "A" was held by straight lines.

Figure 4:
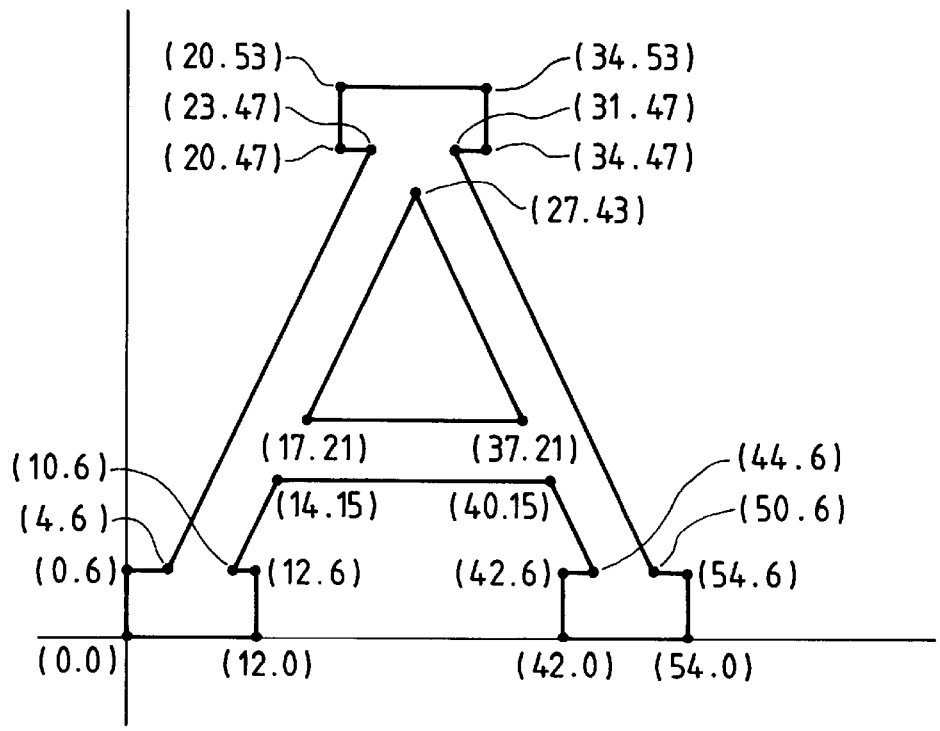
FIG. 4 is an explanatory diagram of a character which is expressed by data in FIG. 3.

FIG. 4 shows a pattern of the character "A" which is expressed by the data of FIG. 3.

The method of holding the pattern of a character, a figure, or the like in a form other than the form of the dot image which can be printed without executing any process is not limited to the above example but various other methods are considered. For instance, it can be expressed by a curve portion.

Figure 5:
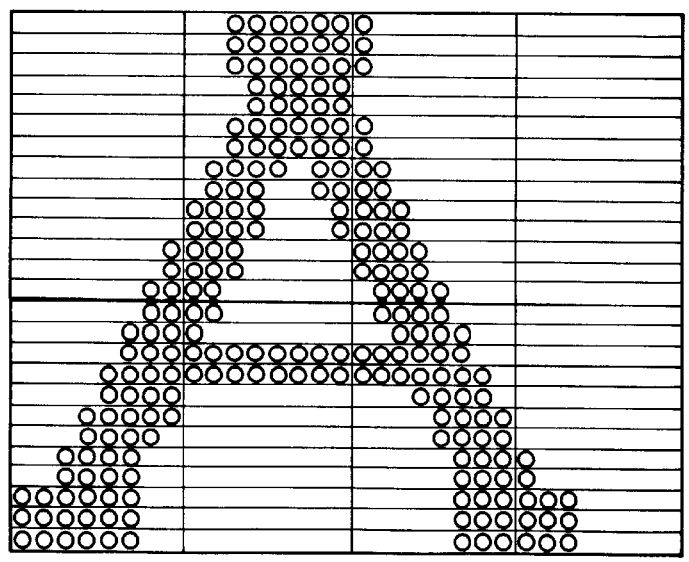
FIG. 5 is a diagram showing an example in the case where a character "A" held in a form of FIG. 3 was converted into a printable dot image.

FIG. 5 shows an example in which the character "A" held in the form of FIG. 3 was converted into the dot image which can be printed and relates to the example in which it was stored into the program ROM 12 by the MPU 13. On the other hand, the size of pattern which was converted into the dot image shown in FIG. 5 can be arbitrarily set by the MPU 13. With respect to the size, if the resolution conversion is fixedly set, data can be also set in the ROM 12 or the like. On the other hand, it is also possible to convert the vector data into the dot data and to also previously have data for correction of a line width according to the size.

A change in print density in the printer 7 in FIG. 1 will now be described. For instance, in the case of printing at a resolution of 240 dpi, it is assumed that a rotational speed of the scanner is set to $R_1$ and video clocks are set to $F_1$. A scanner rotational speed is set to $R_2$ and video clocks are set to $F_2$ in the case where the print density was changed to 300 dpi. Now, assuming that the rotational speed of the photo sensitive drum 25 does not change, the scanner rotational speed $R_2$ is equal to ($R_2=R_1\times(300/240)$) and the video clocks are equal to ($F_2=F_1\times(300/240)^2$) in consideration of the vertical and lateral directions. Therefore, when printing at a resolution of 240 dpi, the MPU 13 instructs the pulse generator 8 to set the output frequency to $F_1$ and also instructs the scanner driver 9 to set the scanner rotational speed to $R_1$. Similarly, in the case of printing at a resolution of 300 dpi, the MPU 9 instructs $F_2$ and $R_2$, respectively.

The character size and the dot construction will now be described.

When the print density is set to 240 dpi, a character of, for instance, a 12-point size comprises 40×40 dots. When the print density is set to 300 dpi, a character of a 12-point size comprises 50×50 dots.

Now, assuming that when the MPU 13 read out the print parameters from the work memory 3, the print density was changed from 240 dpi to 300 dpi, for instance, a character of a 12-point size comprises 50×50 dots and does not exist in the dot pattern ROM 4. The dot pattern ROM 4 is an ROM of the minimum capacity. At this time, as already described above, the MPU 13 accesses the vector character pattern ROM 10 and stores the dot pattern comprising 50×50 dots into the RAM 11.

Figure 6B:
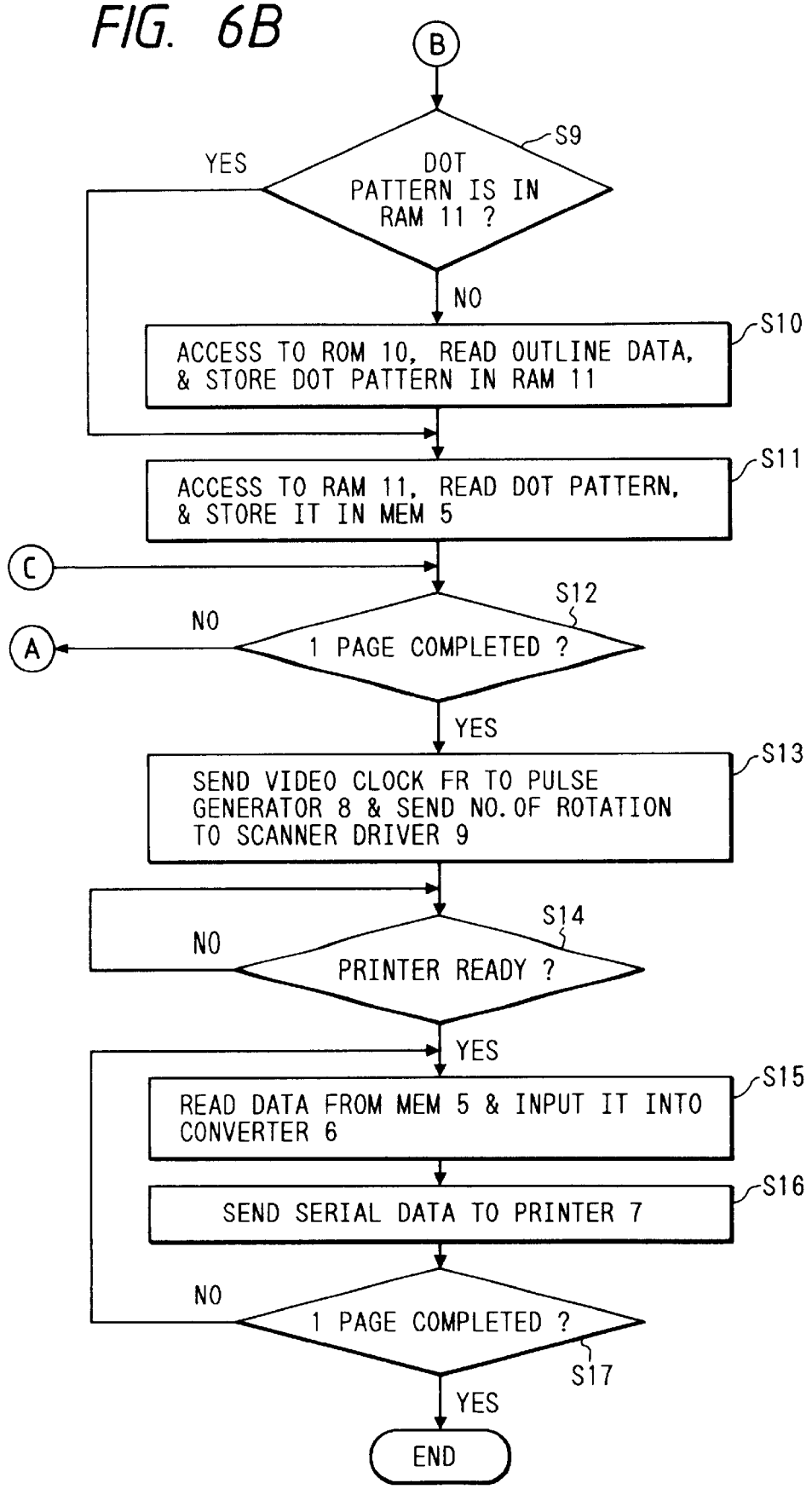

FIG. 6 is a flowchart showing an example of a printing processing procedure. A check is made to see if the input data denotes a print parameter or not in step S1. If YES, step S3 follows and the data is stored into the work memory 3. Then, step S1 follows. If NO in step S1, step S2 follows and the data is stored into the page buffer 2.

A check is then made in step S4 to see if the data storage of one page has been completed or not. If NO, step S1 follows. If YES in step S4, the print density is read out of the work memory in step S5.

Then, the data is read out of the page buffer in step S6. A check is made to see if the corresponding font exists in the dot pattern ROM or not in step S7. If YES, the dot pattern ROM is accessed and the read data is stored into the bit map memory. Then, step S12 follows. If NO in step S7, step S9 follows and a check is made to see if a dot pattern exists in the RAM 11 or not. If YES, the processing routine advances to step S11. If NO in step S9, step S10 follows and the character pattern ROM is accessed, the outline data is read out and converted into the dot pattern, and the dot pattern is stored into the RAM. In the next step S11, the RAM is accessed and the dot pattern is read out and stored into the bit map memory.

A check is made to see if the data storage of one page has been completed or not in step S12. If NO, step S6 follows. If YES, the video clock frequency corresponding to the print density of the relevant page is output to the pulse generator and the scanner rotational speed is output to the scanner driver. In step S14, a check is made to see if the printer has been set into the ready mode or not. If YES, step S15 follows and the data is read out of the bit map memory and input to the parallel/series converter. In the next step S16, the serial data is sent to the printer. In step S17, a check is made to see if the data transfer of one page has been completed or not. If NO, step S15 follows.

[Another embodiment]

The embodiment has been described with respect to the case of the laser system using the scanner rotational speed and the video clocks as print density changing means. However, the invention can be also applied to a printer or a display device of an LED or a liquid crystal shutter system.

As described above, by providing both of the means for holding a pattern of a character, a figure, or the like in a form other than a dot image form and the means for converting the pattern into the dot image, the dot pattern font memory can be reduced and even if the print density was changed to an arbitrary density by the print density changing means, the font can be fully stored.

According to the invention, it is possible to provide an output apparatus comprising: change instructing means for instructing a change in output resolution; holding means for holding vector font data; and converting means for converting the vector font data which is held by the holding means and is to be output into the dot data in accordance with the output resolution and the instruction from the change instructing means.

According to the invention, it is possible to provide an output apparatus comprising: first holding means for holding dot font data; second holding means for holding vector font data; change instructing means for instructing a change of an output resolution; discriminating means for discriminating whether dot font data to be output to the first holding means exists or not; and converting means for converting the vector font data held in the second holding means into the dot data in accordance with the output resolution on the basis of the instruction from the change instructing means and the result of the discrimination from the discriminating means.

What is claimed is:

1. An output apparatus comprising:

first memory means, comprising a read-only memory, for storing dot font data;

second memory means, comprising a read-only memory, for storing vector font data;

third memory means, comprising a random-access memory, for storing dot font data generated from the vector font data stored in said second memory means;

recognition means for recognizing a resolution;

first discrimination means for discriminating whether the dot font data corresponding to a character to be output is stored in said first memory means based on the resolution recognized by said recognition means and a size of the character to be output;

second discrimination means for, if said first discrimination means discriminates that the corresponding dot font data is not stored in said first memory means, discriminating whether the corresponding dot font data is stored in said third memory means; and output means for, (a) if said first discrimination means discriminates that the corresponding dot font data is stored in said first memory means, outputting a character based on that dot font data stored in said first memory means, (b) if said second discrimination means discriminates that the corresponding dot font data is stored in said third memory means, outputting a character based on the dot font data stored in said third memory means, and (c) if said second discrimination means discriminates that the corresponding dot font data is not stored in said third memory means, outputting a character based on dot font data corresponding to the character to be output generated from the vector font data stored in said second memory means.

2. An apparatus according to claim 1, wherein said apparatus is a printer.

3. An apparatus according to claim 2, wherein the resolution is variable in said printer.

4. An apparatus according to claim 1, wherein a size of the character to be output is represented by a point size.

5. A method carried out in an output apparatus comprising a first memory for storing dot font data, a second memory for storing vector font data and a third memory for storing dot font data generated from the vector font data stored in the second memory, the first and second memories being read-only memories and the third memory being a random-access memory, said method:

a step of recognizing a resolution;

a first discrimination step of discriminating whether the dot font data corresponding to a character to be output is stored in the first memory based on the resolution recognized in said recognizing step and a size of the character to be output;

a second discrimination step of, if it is discriminated in said first discrimination step that the corresponding dot font data is not stored in the first memory, discriminating whether the corresponding dot font data is stored in the third memory; and an output step of, (a) if it is discriminated in said first discrimination step that the corresponding dot font data is stored in the first memory, outputting a character based on that dot font data stored in the first memory, (b) if it is discriminated in said second discrimination step that the corresponding dot font data is stored in the third memory, outputting a character based on that dot font data stored in the third memory, and (c) if it is discriminated in said second discrimination step that the corresponding dot font data is not stored in the third memory, outputting a character based on the dot font data corresponding to the character to be output generated from the vector font data stored in the second memory.

6. A method according to claim 5, wherein said output step outputs the character using a printer.

7. A method according to claim 6, wherein the resolution is variable in the printer.

8. A method according to claim 5, wherein a size of the character to be output is represented by a point size.

9. A computer-useable medium storing computer-useable instructions for controlling an output apparatus comprising a first memory for storing dot font data, a second memory for storing vector font data and a third memory for storing dot font data generated from the vector font data stored in the second memory, the first and second memories being read-only memories and the third memory being a random-access memory, said instructions comprising:

instructions for recognizing a resolution;

first discrimination instructions for discriminating whether the dot font data corresponding to a character to be output is stored in the first memory based on the resolution recognized by said instruction for recognizing and a size of the character to be output;

second discrimination instructions for, if said first discrimination instructions discriminate that the corresponding dot font data is not stored in the first memory, discriminating whether the corresponding dot font data is stored in the third memory; and output instructions for (a) if said first discrimination instructions discriminate that the corresponding dot font data is stored in the first memory, outputting a character based on that dot font data stored in the first memory, (b) if said second discrimination instructions discriminate that the corresponding dot font data is stored in the third memory, outputting a character based on that dot font data stored in the third memory, and (c) if said second discrimination instructions discriminate that the corresponding dot font data is not stored in the third memory, outputting a character based on dot font data corresponding to the character to be output generated from the vector font data stored in the second memory.

10. A computer-useable medium according to claim 9, wherein said output instructions output the character using a printer.

11. A computer-useable medium according to claim 10, wherein the resolution is variable in the printer.

12. A computer-useable medium according to claim 9, wherein a size of the character to be output is represented by a point size.

13. A character processing apparatus comprising:

first memory means, comprising a read-only memory, for storing dot font data;

second memory means, comprising a read-only memory, for storing vector font data;

third memory means, comprising a random-access memory, for storing dot font data generated from the vector font data stored in said second memory means;

recognition means for recognizing a resolution;

first discrimination means for discriminating whether the dot font data corresponding to a character to be output is stored in said first memory means based on the resolution recognized by said recognition means and a size of the character to be output;

first development means for, if said first discrimination means discriminates that the corresponding dot font data is stored in said first memory means, developing that dot font data stored in said first memory means into bit map data in a bit map memory;

second discrimination means for, if said first discrimination means discriminates that the corresponding dot font data is not stored in said first memory means, discriminating whether the corresponding dot font data is stored in said third memory means;

second development means for, if said second discrimination means discriminates that the corresponding dot font data is stored in said third memory means, developing that dot font data stored in said third memory means into bit map data in the bit map memory; and third development means for, if said second discrimination means discriminates that the corresponding dot font data is not stored in said third memory means, generating dot font data corresponding to the character to be output from the vector font data stored in said second memory means, and developing the generated dot font data into bit map data in the bit map memory.

14. An apparatus according to claim 13, further comprising output means for outputting a character based on the dot font data developed in the bit map memory.

15. An apparatus according to claim 13, wherein said output means comprises a printer.

16. An apparatus according to claim 15, wherein the resolution is variable in said printer.

17. An apparatus according to claim 13, wherein a size of the character to be output is represented by a point size.

18. A method carried out in a character processing apparatus comprising first memory means for storing dot font data, second memory means for storing vector font data, and third memory means for storing dot font data generated from the vector font data stored in the second memory means, the first and second memory means comprising a read-only memory and the third memory means comprising a random-access memory, said method comprising:

a recognition step of recognizing a resolution;

a first discrimination step of discriminating whether the dot font data corresponding to a character to be output is stored in the first memory means based on the resolution recognized in said recognition step and a size of the character to be output;

a first development step of, if it is discriminated in said first discrimination step that the corresponding dot font data is stored in the first memory means, developing that dot font data stored in the first memory means into bit map data in a bit map memory;

a second discrimination step of, if it is discriminated in said first discrimination step that the corresponding dot font data is not stored in the first memory means, discriminating whether the corresponding dot font data is stored in the third memory means;

a second development step of, if it is discriminated in said second discrimination step that the corresponding dot font data is stored in the third memory means, developing that dot font data stored in the third memory means into bit map data in the bit map memory; and a third development step of, if it is discriminated in said second discrimination step that the corresponding dot font data is not stored in the third memory means, generating dot font data corresponding to the character to be output from the vector font data stored in the second memory means, and developing the generated dot font data into bit map data in the bit map memory.

19. A method according to claim 18, further comprising an output step of outputting a character based on the dot font data developed in the bit map memory.

20. A method according to claim 19, wherein a printer is used in said output step.

21. A method according to claim 20, wherein the resolution is variable in the printer.

22. A method according to claim 18, wherein a size of the character to be output is represented by a point size.

23. A computer-useable medium storing computer-useable instructions of controlling a character processing apparatus comprising a first memory for storing dot font data, a second memory for storing vector font data, a third memory for storing dot font data generated from the vector font data stored in the second memory, the first and second memories being read-only memories and the third memory being a random-access memory, said instructions comprising:

instructions for recognizing a resolution;

first discrimination instructions for discriminating whether the dot font data corresponding to a character to be output is stored in the first memory;

second discrimination instructions for discriminating whether the dot font data corresponding to the character to be output is stored in the third memory based on the resolution recognized by said instructions for recognizing and a size of the character to be output, if said first discrimination instructions discriminate that the corresponding dot font data is not stored in the first memory;

first development instructions for, if said first discrimination instructions discriminate that the corresponding dot font data is stored in the first memory, developing that dot font data stored in the first memory into bit map data in a bit map memory;

second development instructions for, if said second discrimination instructions discriminate that the corresponding dot font data is stored in the third memory, developing that dot font data stored in the third memory into bit map data in the bit map memory; and third development instructions for, if said second discrimination instructions discriminate that the corresponding dot font data is not stored in the third memory, generating dot font data corresponding to the character to be output from the vector font data stored in the second memory, and developing the generated dot font data into bit map data in the bit map memory.

24. A computer-useable medium according to claim 23, further comprising output instructions for outputting a character based on the dot font data developed in the bit map memory.

25. A computer-useable medium according to claim 24, wherein a printer is used by said output instructions.

26. A computer-useable medium according to claim 25, wherein the resolution is variable in the printer.

27. A computer-useable medium according to claim 23, wherein a size of the character to be output is represented by a point size.

28. A character processing apparatus comprising:

a first memory having a dot font stored in said first memory, wherein the stored dot font is not generated by said character processing apparatus;

a second memory having a vector font stored in said second memory;

memory means for storing a dot font generated from the vector font stored in said second memory;

first discrimination means for discriminating whether a dot font corresponding to a character to be output is stored in said first memory;

second discrimination means for, if said first discrimination means discriminates that the corresponding dot font is not stored in said first memory, discriminating whether the corresponding dot font is stored in said memory means; and drawing means for, (a) if said second discrimination means discriminates that the corresponding dot font is not stored in said memory means, generating a dot font based on the vector font stored in said second memory and drawing the generated dot font in a third memory, (b) if said first discrimination means discriminates that the corresponding dot font is stored in said first memory, drawing the dot font stored in said first memory into the third memory, and (c) if said second discrimination means discriminates that the corresponding dot font is stored in said memory means, drawing the dot stored in said memory means into the third memory.

29. An apparatus according to claim 28, further comprising output means for outputting a character based on the dot font drawn in the third memory.

30. An apparatus according to claim 28, wherein said first and second discrimination means perform respective discrimination operations based on an output resolution and a character size.

31. A character processing method using a first memory having a dot font stored therein, wherein the stored dot font is not generated by the character processing method, a second memory having a vector font stored therein and memory means for storing a dot font generated from the vector font stored in the second memory, comprising:

a first discriminating step of discriminating whether a dot font corresponding to a character to be output is stored in the first memory;

a second discriminating step of, if it is discriminated in said first discriminating step that the corresponding dot font is not stored in the first memory, discriminating whether the corresponding dot font is stored in the third memory; and a drawing step of, (a) if it is discriminated in said second discriminating step that the corresponding dot font is not stored in the memory means, generating a dot font based on the vector font stored in the second memory and drawing the generated dot font in a third memory, (b) if it is discriminated in said first discriminating step that the corresponding dot font is stored in the first memory, drawing the dot font stored in the first memory in the third memory, and (c) if it is discriminated in said second discriminating step that the corresponding dot font is stored in the memory means, drawing the dot font stored in the memory means in the third memory.

32. A method according to claim 31, further comprising a step of outputting a character based on the dot font drawn in the third memory.

33. A method according to claim 31, wherein said first and second discriminating steps include performing respective discrimination operations based on an output resolution and a character size.

34. A memory medium storing a program for controlling a character processing apparatus using a first memory having a dot font stored therein, wherein the stored dot font is not generated by the character processing apparatus, a second memory having a vector font stored therein and memory means for storing a dot font generated from the vector font stored in the second memory, the program comprising:

a first discriminating step of discriminating whether a dot font corresponding to a character to be output is stored in the first memory;

a second discriminating step of, if it is discriminated in said first discriminating step that the corresponding dot font is not stored in the first memory, discriminating whether the corresponding dot font is stored in the third memory; and a drawing step of, (a) if it is discriminated in said second discriminating step that the corresponding dot font is not stored in the memory means, generating a dot font based on the vector font stored in the second memory and drawing the generated dot font in a third memory, (b) if it is discriminated in said first discriminating step that the corresponding dot font is stored in the first memory, drawing the dot font stored in the first memory in the third memory, and (c) if it is discriminated in said second discriminating step that the corresponding dot font is stored in the memory means, drawing the dot font stored in the memory means in the third memory.

35. A memory medium according to claim 34, wherein the program further comprises a step of outputting a character based on the dot font drawn in the third memory.

36. A memory medium according to claim 34, wherein said first and second discriminating steps include performing respective discrimination operations based on an output resolution and a character size.

* * * * *

UNITED STATES PATENT AND TRADEMARK OFFICE
CERTIFICATE OF CORRECTION

PATENT NO. : 5,946,001
DATED : August 31, 1999
INVENTOR(S) : YUKIO ISAKA

It is certified that error appears in the above-identified patent and that said Letters Patent is hereby corrected as shown below:

COLUMN 1

Line 28, "a" should be deleted.

COLUMN 3

Line 18, "MPU 9" should read --MPU 13--; and
    Line 29, "an" should read --a--.

COLUMN 5

Line 14, "method:" should read --method comprising:--.

COLUMN 6

Line 60, "claim 13," should read --claim 14,--.

Signed and Sealed this

Thirty-first Day of October, 2000

Attest:

Q. TODD DICKINSON

*Attesting Officer*      *Director of Patents and Trademarks*